United States Patent [19]

Chan et al.

[11] Patent Number: 4,902,407
[45] Date of Patent: Feb. 20, 1990

[54] CATALYST INVENTORY CONTROL IN AN EBULLATED BED PROCESS

[75] Inventors: Ting Y. Chan; John C. Strickland, both of Houston, Tex.

[73] Assignee: Texaco Inc., White Plains, N.Y.

[21] Appl. No.: 204,318

[22] Filed: Jun. 9, 1988

[51] Int. Cl.$^4$ .................. C10B 31/02; C10B 31/12
[52] U.S. Cl. .................... 208/152; 208/106; 208/107; 208/108; 208/111; 208/113; 208/120; 208/171; 208/143; 208/146; 208/143; 208/157; 208/153; 208/165
[58] Field of Search ............... 208/143, DIG. 1, 146, 208/157, 166, 142, 150, 152, 154, 157, 59; 422/211, 216, 219

[56] References Cited

U.S. PATENT DOCUMENTS

| | | | |
|---|---|---|---|
| 3,183,180 | 5/1965 | Schuman et al. | 208/143 |
| 3,254,019 | 5/1969 | Mitchell et al. | 208/159 |
| 3,294,675 | 12/1966 | Adams et al. | 208/DIG. 1 |
| 3,316,322 | 4/1967 | Glahn | 208/DIG. 1 |
| 3,336,217 | 8/1967 | Meaux | 208/152 |
| 3,363,992 | 1/1968 | Chervenak | 23/288 |
| 3,398,085 | 8/1968 | Engle | 208/157 |
| 3,410,791 | 11/1968 | Perry et al. | 208/143 |
| 3,410,792 | 11/1968 | Van Driesen et al. | 208/143 |
| 3,412,010 | 11/1968 | Alpent et al. | 208/112 |
| 3,523,888 | 8/1970 | Stewart et al. | 208/157 |
| 3,541,002 | 11/1970 | Rapp | 208/143 |
| 3,557,019 | 1/1971 | Van Driesen | 252/416 |
| 3,687,841 | 8/1972 | Saxton et al. | 208/DIG. 1 |
| 3,689,403 | 9/1972 | Long | 208/DIG. 1 |
| 3,718,579 | 2/1973 | Uhl et al. | 208/143 |
| 3,850,582 | 11/1974 | Luckenbach | 208/DIG. 1 |
| 4,606,814 | 8/1986 | Huddad et al. | 208/157 |
| 4,659,455 | 4/1987 | Dull et al. | 208/153 |
| 4,673,552 | 6/1987 | Li et al. | 422/140 |
| 4,684,456 | 8/1987 | Van Priesen et al. | 208/143 |
| 4,744,887 | 5/1988 | Van Dreisen et al. | 208/152 |
| 4,750,989 | 6/1988 | Soderberg | 208/143 |

Primary Examiner—Helane Myers
Attorney, Agent, or Firm—Jack H. Park; Kenneth R. Priem; Richard A. Morgan

[57] ABSTRACT

An improved method of controlling catalyst inventory in the reactor of an ebullated bed process has been discovered. Pressure differentials are measured to calculate a catalyst inventory characterization factor. Aged catalyst is withdrawn and fresh catalyst added in an amount to reestablish the value of the factor.

The catalyst to oil ratio is maintained despite changes in bed ebullation, gas and liquid holdups and oil residence time changes.

6 Claims, 1 Drawing Sheet

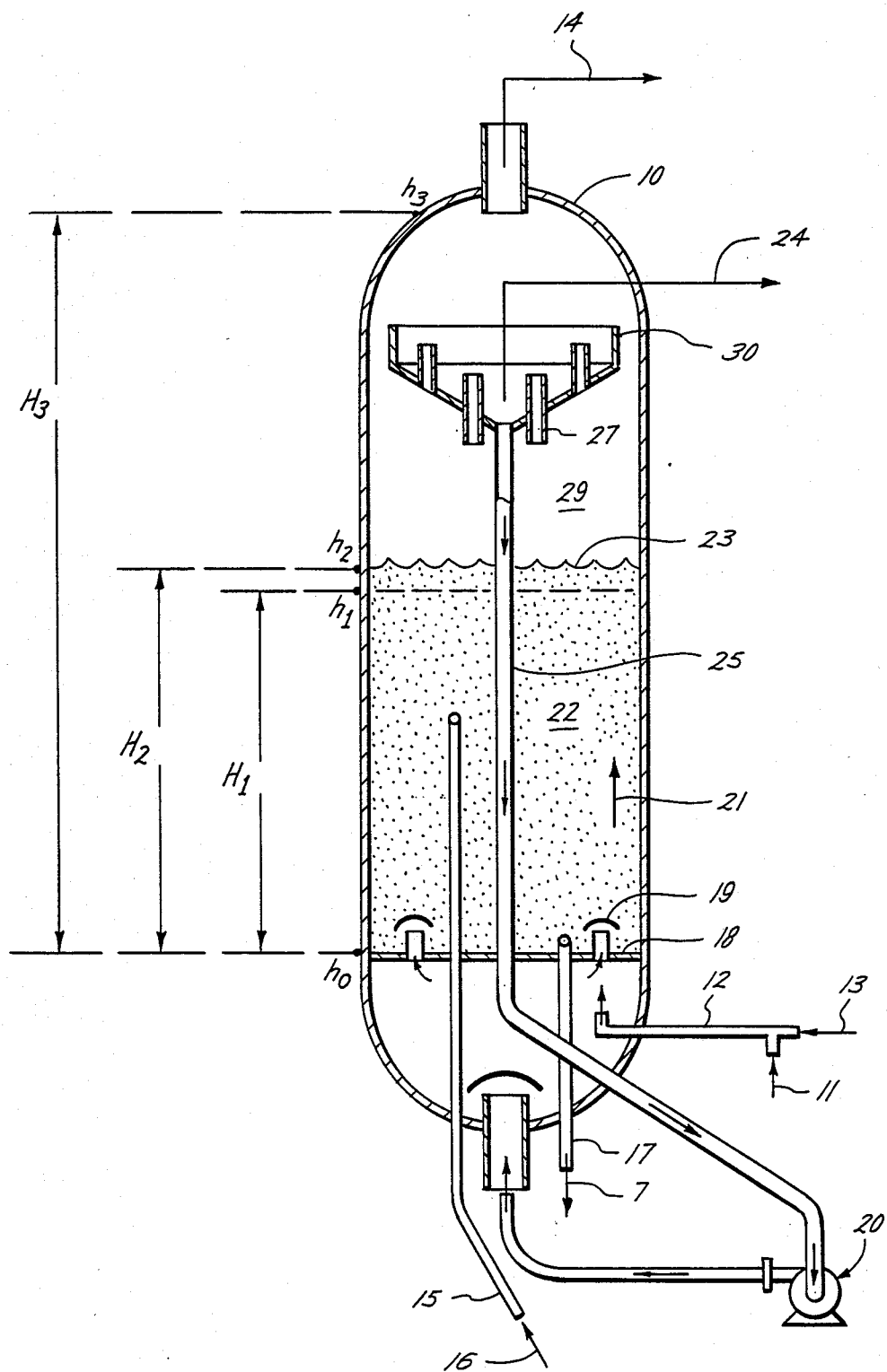

CATALYST INVENTORY CONTROL IN AN EBULLATED BED PROCESS

BACKGROUND OF THE INVENTION

1. Field of the Invention

The invention relates to an improved method of controlling catalyst inventory in the reactor of an ebullated bed process. The method is used in conjunction with adding catalyst and relates to the determination of a catalyst inventory characterization factor.

2. Description of Other Relevant Methods in the Field

The ebullated bed process comprises the passing of concurrently flowing streams of liquids, or slurries of liquids and solids, and gas through a vertically cylindrical vessel containing catalyst. The catalyst is placed in random motion in the liquid and has a gross volume dispersed through the liquid medium greater than the volume of the mass when stationary. This technology has found commercial application in the upgrading of heavy liquid hydrocarbons or converting coal to synthetic oils.

The process is generally described in U.S. Pat. Re No. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapors along with the liquid which is being hydrogenated pass through that upper level of catalyst particles into a substantially catalyst free zone and are removed at the upper portion of the reactor.

In an ebullated bed process the substantial amounts of hydrogen gas and light hydrocarbon vapors present rise through the reaction zone into the catalyst free zone. Liquid is both recycled to the bottom of the reactor and removed from the reactor as product from this catalyst free zone. Vapor is separated from the liquid recycle stream before being passed through the recycle conduit to the recycle pump suction. The recycle pump (ebullation pump) maintains the expansion (ebullition) and random motion of catalyst particles at a constant and stable level. Gases or vapors present in the recycled liquid materially decrease the capacity of the recycle pump as well as alter the flow pattern within the reactor and thus decrease stability of the ebullated bed.

Reactors employed in a catalytic hydrogenation process with an ebullated bed of catalyst particles are designed with a central vertical recycle conduit which serves as the downcomer for recycling liquid from the catalyst free zone above the ebullated catalyst bed to the suction of a recycle pump to recirculate the liquid through the catalytic reaction zone. The recycling of liquid from the upper portion of the reactor serves to ebullate the catalyst bed, maintain temperature uniformity through the reactor and stabilize the catalyst bed.

U.S. Pat. No. 4,684,456 to R. P. Van Driesen et al. teaches the control of catalyst bed expansion in an expanded bed reactor. In the process, the expansion of the bed is controlled by changing the reactor recycle pump speed. The bed is provided with high and low level bed detectors and an additional detector for determining abnormally high bed (interface) level. The interface level is detected by means of a density detector comprising a radiation source at an interior point within the reactor and a detection source in the reactor wall. Raising and lowering the bed level changes the density between the radiation source and the radiation detector. It is apparent from the patent that the vertical range of steady state bed (interface) level as well as the highest and lowest steady state interface level is a design parameter.

U.S. Pat. No. 4,673,552 to A. S. Li et al. teaches a downwardly directed fluid flow distributor for recycle liquid in an ebullated bed reactor. The figures show the plenum 12 below the distributor grid 18 of reactor 14 contains inlet conduit 10, central conduit 24 and sparger ring 40. Ebullated catalyst bed 20 is supported on distribution grid 18 by a combination of recycle liquid and liquid and gas feed through tubes 26 and caps 28.

U.S. Pat. Nos. 3,410,791 to L. A. Perry et al.; 3,523,888 to N. C. Stewart et al. and 3,557,019 to R. P. Van Driesen teach an ebullated bed process wherein there is means for withdrawing catalyst from the bed and adding catalyst to the bed.

U.S. Pat. Nos. 3,412,010 to S. B. Alpert et al. and 3,363,992 to M. C. Chervenak teach an ebullated bed process. In the drawing is shown a catalyst bed interface and a catalyst level control. Also taught is an optional third, vapor phase filling the top of the reactor.

U.S. Pat. No. 3,398,085 to T. M. Engle teaches a process for catalyst addition and withdrawal in an ebullated bed process to maintain an average inventory of particulate solids in the reaction zone. Catalyst is introduced to a solids holding zone. The zone is purged of gases with oil and then sealed from the atmosphere. The sealed, oil filled catalyst zone is then pressured to reactor pressure and then transferred by liquid transport to the reaction zone by liquid phase transport. Solids are removed from the upper part of the reaction zone through a flow line at a rate corresponding to the rate transfer into the reaction zone by applying external gas under pressure to the flow line.

BRIEF DESCRIPTION OF THE DRAWING

The drawing is a sectional elevated view of the reaction vessel with measurement points indicated.

DETAILED DESCRIPTION OF THE DRAWING

In order to demonstrate and provide a better understanding of the invention, reference is made to the drawing.

Reaction vessel 10 is positioned with its long axis in a vertical position and is generally of a circular cross section. Although this drawing is schematic in order to show its various features, it will be understood that the reactor is constructed in such a fashion and from such materials that it is suitable for reacting liquids, liquid-solid slurries, solids and gases at elevated temperatures and pressures and in a preferred embodiment for treating hydrocarbon liquids with hydrogen at high pressures and high temperatures, e.g. 100 to 5000 psi and 300° F. to 1500° F. The reactor 10 is fitted with a suitable inlet conduit 12 for feeding heavy oil and a hydrogen-containing gas. Outlet conduits are located in the upper portion of reactor 10; outlet conduit 14 designed to withdraw vapor and liquid, and optionally outlet conduit 24 to withdraw mainly liquid product. The reactor also contains means for introducing and withdrawing catalyst particles, which are shown schematically as conduit 15 through which fresh catalyst 16 is flowed and conduit 17 through which spent catalyst 7 is withdrawn.

Heavy oil feedstock is introduced through conduit 11, while hydrogen-containing gas is introduced through conduit 13, and may be combined with the feedstock and fed into reactor 10 through conduit 12 in the bottom of the reactor. The incoming fluid passes through grid tray 18 containing suitable fluid distribution means. In this drawing, bubble caps 19 are shown as the fluid distribution means, but it is to be understood that any suitable device known in the art which will uniformly distribute the fluid coming from conduit 12 over the entire cross-sectional area of the reactor 10 may be utilized.

The mixture of liquid and gas flows upwardly, and the catalyst particles are thereby forced into an ebullated movement by the gas flow and the liquid flow delivered by recycle pump 20 (ebullation pump) which may be either internal or external to the reactor 10. The upward liquid flow delivered by this recycle pump 20 is sufficient to cause the mass of catalyst particles in catalytic reaction zone 22 (catalyst bed) to expand by at least 10% and usually up to 100% over the static volume, thus permitting gas and liquid flow as shown by direction arrow 21 through reactor 10. Due to the upwardly directed flow provided by the pump and the downward forces provided by gravity, the catalyst bed particles reach an upward level of travel or ebullation while the lighter liquid and gas continue to move upward beyond that level. In this drawing, the upper level of catalyst or catalyst-liquid interface is shown as interface 23, and the catalytic reaction zone 22 extends from grid tray 18 to level 23. Catalyst particles in catalytic reaction zone 22 move randomly and are uniformly distributed through the entire zone in reactor 10.

At steady state, few catalyst particles rise above catalyst-liquid interface 23. The catalyst depleted zone 29, above the interface 23, is filled with liquid and entrained gas or vapor. Gas and vapor are separated from liquid in the recycle cup 30 to collect and recycle a liquid with a substantially reduced gas and vapor content through recycle conduit 25 of generally circular cross-sectional area. A substantially liquid product may be withdrawn separately from gas and vapor through conduit 24, in which event conduit 14 terminates in a vapor space and is used to withdraw vapor alone. Alternatively gases, vapors, and liquids may be withdrawn together.

The enlarged upper end of recycle conduit 25 is the recycle cup 30. A plurality of vertically directed riser conduits 27 providing fluid communication between catalyst depleted zone 29 and outlet conduit 14. Gas-entrained fluid moves upwardly through the riser conduits 27, and upon leaving the upper ends of these riser conduits, a portion of the fluid reverses direction and flows downward through recycle conduit 25 to the inlet of recycle pump 20 and thereby is recycled to the lower portion of reactor 10 below grid tray 18. Gases and vapors which are separated from the liquid, rise to collect in the vapor portion of reactor 10 and are removed through outlet conduit 14. The gases and vapors removed at this point are treated using conventional means to recover as much hydrogen as possible for recycle to conduit 13.

An interface height $H_2$ is measured from a point $h_2$ corresponding to the interface 23 to a point $h_o$ adjacent the bottom of the bed, corresponding in this arrangement to the grid tray 18. Point $h_2$ is measured by conventional measuring means such as electronic gamma radiation detector or mechanical float level detector.

An effective bed height $H_1$ is measured from a point $h_o$ adjacent the bottom of the bed to an intermediate fixed point $h_1$ within the bed 22. Intermediate fixed point $h_1$ is selected from the reactor design so that it is not above interface 23. First differential pressure $DP_1$ is measured between point $h_1$ and point $h_o$.

An effective reactor height $H_3$ is measured from a point $h_3$ adjacent the fluid top of the reactor to a point adjacent the bottom of the bed $h_o$. The fluid top comprises the liquid top in a liquid filled reactor and the vapor top where both liquid and vapor phases are present.

Second differential pressure $DP_2$ is measured between point $h_3$ and point $h_1$.

SUMMARY OF THE INVENTION

The invention is an improved method of maintaining a selected weight of catalyst in an ebullated bed process reactor during operation. In the ebullated bed process a fluent hydrocarbon feedstock is catalytically treated with a hydrogen-containing gas at elevated catalytic reaction temperatures and pressures. The feedstock and hydrogen-containing gas are introduced into the lower end of a generally vertical reaction vessel at sufficient velocity to place the catalyst in random motion within the hydrocarbon whereby the catalyst bed is expanded to a volume greater than the static volume, typically 10% to 100% greater. The mixture of feedstock, gas and catalyst constitutes a turbulent zone, the upper portion of which is defined by an interface with a substantially catalyst depleted zone.

The improvement comprises determining an interface height ($H_2$) from a fixed point adjacent the bottom of the bed ($h_o$) to a variable point corresponding to the interface ($h_2$). The effective bed height ($H_1$) is determined from a point adjacent the bottom of the bed ($h_o$) to an intermediate fixed pont ($h_1$) in the bed adjacent and below point ($h_2$). A first differential pressure ($DP_1$) is measured between point $h_o$ and point $h_1$. A reactor height ($H_3$) is determined from a point adjacent the catalyst depleted zone top ($h_3$) to point ($h_o$). A second differential pressure $DP_2$ is measured between point ($h_3$) and point ($h_1$). A value for catalyst inventory characterization factor ($W_c$) is determined as a function of first differential pressure ($DP_1$), second differential pressure ($DP_1$) and interface height ($H_2$). It is understood that the determination of $W_c$ as a function of the sum of $DP_1$ and $DP_2$ is equivalent.

Catalyst is added or withdrawn to maintain the value of catalyst inventory characterization factor ($W_c$). Typically catalyst is added rather than withdrawn, preferably fresh catalyst is added.

DESCRIPTION OF THE PREFERRED EMBODIMENTS

In ebullated bed processes and similar fluidized bed reaction processes it is necessary from time to time or continuously to remove an amount of aged catalyst and replace it with fresh catalyst in order to maintain catalyst activity. In this procedure it is most desirable to add the same weight of fresh catalyst as is withdrawn.

It has also been found that a given feedstock is most effectively treated with a relative amount of catalyst. Data shows that the most effective relative amount can be different for different feedstocks and the relative amount is quantitatively repeatable. It is therefore desirable to quantify a catalyst inventory characterization factor ($W_c$), the specific value for which is optimized for each feedstock by routine procedures and with occasional update of cost and price factors. This catalyst inventory characterization factor then is changed by addition or withdrawal of catalyst for each change in feedstock. The factor is maintained daily or more frequently, e.g. once per shift at three shifts per day, by determining the factor and then making up catalyst lost with the liquid effluent.

Heretofore the amounts of catalyst added to the reactor have been estimated. This is because the process is a dynamic system with quantities such a degree of fluidization, i.e. bed expansion; gas and liquid holdups, with gassy liquid density changing with pressure; and residence time changing continuously to such a degree that catalyst cannot be added with precision by any method postulating steady state in these parameters.

The process has been discovered which avoids cumbersome methods of estimation of inventory control to achieve optimum yield from each feedstock.

The invention relies on the determination of a catalyst inventory characterization factor ($W_c$) which represents an empirical determination of catalyst inventory which is easily determined, yet accounts for the dynamic nature of the process.

The quantities determined by this method with units of measurement are as follows:

$W_c$ = catalyst inventory characterization factor (weight)

$r_f$ = reactor fluid (liquid+gas) density (weight/volume)

The quantities measured are as follows:

$E_c$ = fresh catalyst settled bed void fraction (no units)

$r_c$ = fresh catalyst bulk settle density (weight/volume)

$r_s$ = density of a single particle of reactor equilibrium, non-porous oil soaked catalyst, with carbon and metals (weight/volume)

A = reactor cross-sectional area (area)

$H_1$ = height of fixed point in catalyst bed immediately below (adjacent) lowest design operating level of $H_2$ (length)

$H_2$ = height of fluid supported catalyst bed (length)

$H_3$ = reactor height-fixed (length)

$DP_T$ = total reactor pressure drop ($DP_1+DP_2$) (force/area)

$DP_1$ = pressure drop across ($h_o - h_1$) (force/area)

$DP_2$ = pressure drop across ($h_1 - h_3$) (force/area)

From these parameters, three pressure equations are derived:

$$DP_T = \frac{W_c(1 - E_c)(r_s - r_f)}{A\, r_c} + H_3 r_f \quad (1)$$

$$DP_2 = \frac{W_c(H_2 - H_1)(1 - E_c)(r_s - r_f)}{H_2 A\, r_c} + (H_3 - H_1) r_f \quad (2)$$

$$DP_1 = \frac{W_c H_1(1 - E_c)(r_s - r_f)}{H_2 A\, r_c} + H_1 r_f \quad (3)$$

Since $DP_T = DP_1 + DP_2$, only two of three equations are independent. To reduce the error in evaluating catalyst inventory characterization factor ($W_c$), it is desirable to simultaneously solve equations 2 and 3 for $W_c$.

This invention is shown by way of Example.

EXAMPLE

An ebullated bed reactor is operated according to the invention. Before catalyst withdrawal, the following data is measured.

A = 99 ft.$^2$
$H_3$ = 71.2 ft.
$H_2$ = 58 ft.
$H_1$ = 48 ft.
$DP_1$ = 2664 lb/ft.$^2$
$DP_2$ = 778 lb/ft.$^2$
$E_c$ = 0.37
$r_c$ = 37 lb/ft.$^3$
$r_s$ = 120 lb/ft.$^3$

Equations 2 and 3 are solved simultaneously for the value of $W_c$.

An amount of aged catalyst and oil is withdrawn and discarded. $DP_1$ does not change. $DP_2$ is reduced. Fresh catalyst is added until the value of $W_c$ is reestablished. Optimum catalyst/oil ratio is thereby maintained.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocarbon is removed, wherein the improvement comprises:
   1. determining an interface height ($H_2$) from a point adjacent the bottom of the bed ($h_o$) to a point corresponding to the interface ($h_2$),
   2. determining an effective bed height ($H_1$) from a point adjacent the bottom of the bed ($h_o$) to an intermediate fixed point ($h_1$) in the bed adjacent the interface,
   3. determining a reactor height ($H_3$) from a point adjacent the catalyst depleted zone top ($h_3$) to the point adjacent the bottom of the bed ($h_o$),
   4. measuring a differential pressure ($DP_2$) between the point adjacent the catalyst depleted zone top ($h_3$) and the intermediate fixed point ($h_1$),
   5. determining a value for a catalyst inventory characterization factor ($W_c$) in accordance with the general formula:

$$W_c = \frac{H_2 DP_2}{K_1(H_2 - H_1)} - \frac{H_2 K_2(H_3 - H_1)}{K_1(H_2 - H_1)}$$

wherein:
$K_1 =$ $$\frac{(1-E_c)(r_s - r_f)}{A \quad r_c}$$

$K_2 = r_f$
$E_c$ = fresh catalyst void fraction
$r_c$ = fresh catalyst bulk settled density
$r_s$ = reactor equilibrium single particle catalyst density
$r_f$ = reactor total fluid density
A = reactor cross-sectional area, 6. removing aged catalyst, thereby changing the value of said catalyst inventory characterization factor ($W_c$), and
7. adding fresh catalyst in an amount to return to said value of catalyst inventory characterization factor ($W_c$).

2. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocarbon is removed, wherein the improvement comprises:

1. determining an interface height ($H_2$) from a point adjacent the bottom of the bed ($h_o$) to a point corresponding to the interface ($h_2$),
2. determining an effective bed height ($H_1$) from a point adjacent the bottom of the bed ($h_o$) to an intermediate fixed point ($h_1$) in the bed adjacent the interface, and
3. measuring a differential pressure ($DP_1$) corresponding thereto,
4. determining a value for a catalyst inventory characterization factor ($W_c$) in accordance with the general formula:

$$W_c = \frac{H_2 DP_1}{H_1 K_1} - \frac{K_2 H_2}{K_1}$$

wherein:
$K_1 =$ $$\frac{(1-E_c)(r_s - r_f)}{A \ r_c}$$

$K_2 = r_f$
$E_c$ = fresh catalyst void fraction
$r_c$ = fresh catalyst bulk settled density
$r_s$ = reactor equilibrium single particle catalyst density,
$r_f$ = reactor total fluid density
A = reactor cross-sectional area, 5. removing aged catalyst, thereby changing the value of said catalyst inventory characterization factor ($W_c$), and
6. adding fresh catalyst in an amount to return to said value of catalyst inventory characterization factor ($W_c$).

3. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone from which zone aged catalyst is removed and fresh catalyst is added, the upper portion of which turbulent zone is defined by an interface with a substantially catalyst depleted zone from which zone hydrocarbon is removed, wherein the improvement comprises:

1. determining a point corresponding to the interface ($h_2$),
2. measuring a first differential pressure ($DP_1$) between a point adjacent the bottom of the bed ($h_o$) and an intermediate fixed point ($h_1$) in the bed adjacent the interface,
3. determining a reactor height ($H_3$) from a point adjacent the catwalyst depleted zone top ($h_3$) to the point adjacent the bottom of the bed ($h_o$),
4. measuring a second differential pressure ($DP_2$) between the point adjacent the catalyst depleted zone top ($h_3$) and the intermediate fixed point ($h_1$),
5. determining a value for a catalyst inventory characterization factor ($W_c$) in accordance with the general formula:

$$W_c = \frac{DP_1 + DP_2}{K_1} - \frac{K_2 H_3}{K_1}$$

wherein:
$K_1 =$ $$\frac{(1-E_c)(r_s - r_f)}{A \ r_c}$$

$K_2 = r_f$
$E_c$ = fresh catalyst void fraction
$r_c$ = fresh catalyst bulk settled density
$r_s$ = reactor equilibrium single particle catalyst density
$r_f$ = reactor total fluid density
A = reactor cross-sectional area, 6. removing aged catalyst, thereby changing the value of said catalyst inventory characterization factor ($W_c$), and
7. adding fresh catalyst in an amount to return to said value of catalyst inventory characterization factor ($W_c$).

4. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone, the upper portion of which is defined by an interface with a substantially catalyst depleted zone, wherein the improvement comprises:

1. determining a variable interface height ($H_2$) from a point adjacent the bottom of the bed ($h_o$) to a point corresponding to the interface ($h_2$),
2. determining an effective bed height ($H_1$) from a point adjacent the bottom of the bed ($h_o$) to an intermediate fixed point ($h_1$) in the bed adjacent the interface,
3. determining a reactor height ($H_3$) from a point adjacent the catalyst depleted zone top ($h_3$) to the point adjacent the bottom of the bed ($h_o$),
4. measuring a differential pressure ($DP_2$) between the point adjacent the catalyst depleted zone top ($h_3$) and the intermediate fixed point ($h_1$),
5. determining a value for a catalyst inventory characterization factor ($W_c$) in accordance with the general formula:

$$W_c = \frac{H_2 DP_2}{K_1(H_2 - H_1)} - \frac{H_2 K_2 (H_3 - H_1)}{K_1(H_2 - H_1)}$$

wherein:
$K_1 =$ $$\frac{(1 - E_c)(r_s - r_f)}{A\ r_c}$$

$K_2 = r_f$
$E_c =$ fresh catalyst void fraction
$r_c =$ fresh catalyst bulk settled density
$r_s =$ reactor equilibrium single particle catalyst density
$r_f =$ reactor total fluid density
$A =$ reactor cross-sectional area, 6. adding or withdrawing catalyst in an amount to maintain said value of catalyst inventory characterization factor ($W_c$).

5. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone, the upper portion of which is defined by an interface with a substantially catalyst depleted zone, wherein the improvement comprises:

1. determining an interface height ($H_2$) from a point adjacent the bottom of the bed ($h_o$) to a point corresponding to the interface ($h_2$),
2. determining an effective bed height ($H_1$) from a point adjacent the bottom of the bed ($h_o$) to an intermediate fixed point ($h_1$) in the bed adjacent the interface, and
3. measuring a differential pressure ($DP_1$) corresponding thereto,
4. determining a value for a catalyst inventory characterization factor ($W_c$) in accordance with the general formula:

$$W_c = \frac{H_2 DP_1}{H_1 K_1} - \frac{K_2 H_2}{K_1}$$

wherein:
$K_1 =$ $$\frac{(1 - E_c)(r_s - r_f)}{A\ r_c}$$

$K_2 = r_f$
$E_c =$ fresh catalyst void fraction
$r_c =$ fresh catalyst bulk settled density
$r_s =$ reactor equilibrium single particle catalyst density
$r_f =$ reactor total fluid density
$A =$ reactor cross-sectional area, 5. adding or withdrawing catalyst in an amount to maintain said value of catalyst inventory characterization factor ($W_c$).

6. An improved method of maintaining a selected weight of catalyst in a reactor in a continuous process for treating a fluent hydrocarbon feedstock with a hydrogen-containing gas at elevated catalytic reaction temperatures and pressures in the presence of a bed of particulate solid catalyst, said process comprising introducing the hydrogen-containing gas and feedstock into the lower end of a generally vertical catalyst containing reaction vessel at sufficient velocity whereby the catalyst is placed in random motion within the fluent hydrocarbon whereby the catalyst bed is expanded to a volume greater than its static volume, wherein the mixture of feedstock, gas and catalyst constitutes a turbulent zone, the upper portion of which is defined by an interface with a substantially catalyst depleted zone, wherein the improvement comprises:

1. determining a point corresponding to the interface ($h_2$),
2. measuring a first differential pressure ($DP_1$) between a point adjacent the bottom of the bed ($h_o$) and an intermediate fixed point ($h_1$) in the bed adjacent the interface, and
3. determining a reactor height ($H_3$) from a point adjacent the catalyst depleted zone top ($h_3$) to the point adjacent the bottom of the bed ($h_o$),
4. measuring a second differential pressure ($DP_2$) between the point adjacent the catalyst depleted zone top ($h_3$) and the intermediate fixed point ($h_1$),
5. determining a value for a catalyst inventory characterization factor ($W_c$) in accordance with the general formula:

$$W_c = \frac{DP_1 + DP_2}{K_1} - \frac{K_2 H_3}{K_1}$$

wherein:
$K_1 =$ $$K_2 = r_f \frac{(1-E_c)(r_s - r_f)}{A\, r_c}$$

$E_c$ = fresh catalyst void fraction
$r_c$ = fresh catalyst bulk settled density
$r_s$ = reactor equilibrium single particle catalyst density
$r_f$ = reactor total fluid density
A = reactor cross-sectional area, 6. adding or withdrawing catalyst in an amount to maintain said value of catalyst inventory characterization factor ($W_c$).

* * * * *